United States Patent [19]

Stover

[11] Patent Number: 4,676,149

[45] Date of Patent: Jun. 30, 1987

[54] COFFEE-MAKING AND DISPENSING MACHINE HAVING REMOVABLE RESERVOIR WITH QUICK RELEASE SEAL

[75] Inventor: Kenneth W. Stover, Springfield, Ill.

[73] Assignee: Bunn-O-Matic Corporation, Springfield, Ill.

[21] Appl. No.: 841,851

[22] Filed: Mar. 20, 1986

[51] Int. Cl.[4] ............................................. A47J 31/00
[52] U.S. Cl. ........................................ 99/285; 99/295; 285/231; 403/197
[58] Field of Search .................. 99/279, 285, 300, 304, 99/295, 302 R, 307; 285/231, 345; 403/191, 197, 220

[56] References Cited

U.S. PATENT DOCUMENTS

| | | | |
|---|---|---|---|
| 3,782,401 | 1/1974 | Moore | 285/231 |
| 4,094,233 | 6/1978 | Martin | 99/305 |
| 4,207,809 | 6/1980 | Brill | 99/279 |
| 4,309,939 | 1/1982 | Stover | 99/295 |
| 4,366,920 | 1/1983 | Greenfield | 99/285 |
| 4,464,981 | 8/1984 | Stover | 99/280 |
| 4,478,139 | 10/1984 | Zimmerman | 99/280 |
| 4,621,571 | 11/1986 | Roberts | 99/295 |

Primary Examiner—Robert W. Jenkins
Attorney, Agent, or Firm—Lockwood, Alex, FitzGibbon & Cummings

[57] ABSTRACT

A coffee-making and dispensing machine wherein coffee discharges from a brewing funnel into a reservoir from which increments of coffee are withdrawn through a dispensing spout into consumers' cups. The brewing funnel and reservoir are insertable and removable through the front access side of the machine into a reservoir compartment. The dispensing spout is located at the lower portion of the front access side and receives coffee from the reservoir through a conduit. A sight glass is also connected by a conduit providing communication with the reservoir. A quick connect-disconnect fluid-tight connection is provided between the reservoir and the inlet to the conduits. Ths connection is provided in part by a tubular male projection on the bottom of the reservoir and in part by a stationary female receptacle which includes a secured-in-place diaphragm in the form of a sheet of resilient rubber-like material of substantial thickness having a central opening sized to receive the male projection with a fluid-tight interference fit.

3 Claims, 6 Drawing Figures

COFFEE-MAKING AND DISPENSING MACHINE HAVING REMOVABLE RESERVOIR WITH QUICK RELEASE SEAL

This invention relates, generally, to coffee-making and dispensing machines in which fresh brewed coffee discharges from a brewing funnel into an accumulating reservoir from which cup-sized increments are withdrawn to consumers' cups. This type of coffee-making and dispensing machine is particularly suited for coin operation. Accordingly, the accumulating reservoir will usually be locked in a compartment accessible only to authorized operators or personnel. Periodically, the frequency of which depends on a number of factors, it is a requirement that the reservoir be removable for cleaning and washing. A sight glass may be provided permitting viewing of the beverage level with the reservoir.

The present invention is particularly concerned with a quick and convenient intermediate means for interconnecting a male outlet in the bottom of the reservoir with a conduit leading to a dispensing spout whereby cup-sized increments of coffee can be withdrawn from the reservoir and dispensed into customers' cups.

The object of the invention, generally stated, is the provision of a quick and convenient interconnection between a beverage accumulating reservoir and the inlet end of a conduit leading to a dispensing spout in a coffee-making and brewing machine, which connection permits the reservoir to be disconnected and removed and then inserted or replaced in its in-service position in the machine so as to have a fluid-tight connection between its outlet and the inlet to the conduit.

More specifically, an object of the invention is to provide for a quick and convenient fluid-tight interconnection between a male outlet projecting from the bottom of a reservoir in a coffee-making and dispensing machine and a sump having a bottom fitting to which a conduit leading to a dispensing spout may be conveniently connected, and, if desired, to which another conduit leading to a sight glass may also be connected.

An important object of the invention is the provision of means for quickly and conveniently establishing a fluid-tight interconnection between a male discharge fitting on the bottom of a beverage accumulating reservoir and a sump which allows the interconnection to be broken when the reservoir is tilted upwardly sufficiently to permit removal and to be re-established when the reservoir is tilted downwardly to its horizontal position it normally occupies when the machine is in service.

Certain other objects of the invention will in part be obvious and will in part appear hereinafter.

For a more complete understanding of the nature and scope of the invention reference may now be had to the following detailed description of the embodiment shown in the accompanying drawings, wherein:

FIG. 3 is a fragmentary elevational view taken on line 3—3 of FIG. 2 with the door to the reservoir compartment opened so as to provide an end view of the reservoir therein;

FIG. 4 is a detailed sectional view on enlarged scale taken on line 4—4 of FIG. 2 showing the fluid-tight connection between the reservoir and a sump from which beverage can be withdrawn to a dispensing spout and sight glass;

Figure 1:
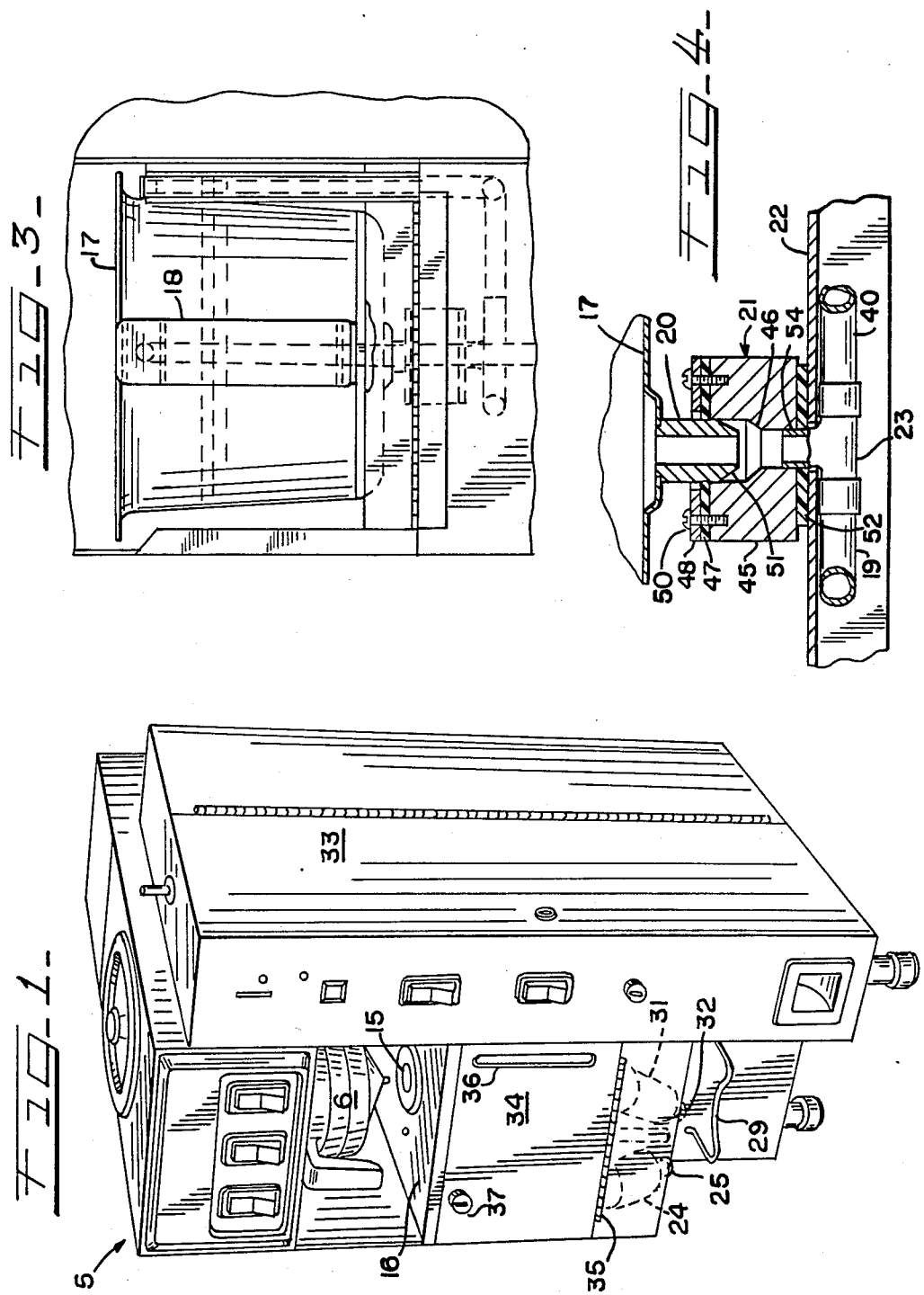
FIG. 1 is a front, top and left-side perspective view of a coffee-making and dispensing machine embodying the invention.

Referring to FIG. 1 of the drawings, a coin-operated coffee-making and dispensing machine is indicated generally at 5 which incorporates a combination automatic/pour-in coffee brewing machine of known type such as the ones disclosed in U.S. Pat. Nos. 4,464,981 granted Aug. 14, 1984 to Kenneth W. Stover and 4,478,139 granted Oct. 23, 1984 to John D. Zimmerman, the disclosures of which are incorporated by reference herein. As is known and described in these patents, a brewing funnel 6 is provided into which a disposable paper filter is inserted and on top of which a charge of coffee is placed. A batch of cold water is then introduced into a cold water basin 7 (FIG. 2) either automatically from a pressurized source (e.g. the water distribution system of a building) or manually through a screened opening 8 provided with a removable cover 10.

The cold or cool water drains from the basin 7 through a fill tube (not shown) into the bottom of a hot water tank 11 from which it upwardly displaces an equal amount of hot water through the hot water tube 12 from which it discharges through a spray nozzle 13 and sprays onto the coffee within the funnel 6. The resulting fresh-brewed coffee discharges from the funnel 6 through the bottom outlet 14 which is centered over an opening 15 in the hinged cover 16 of a reservoir or container 17.

The front sidewall of the reservoir 17 is equipped with a handle indicated generally at 18 which is used to manually insert and remove the reservoir 17 into and from the space or compartment it occupies within the machine 5. The bottom of the reservoir 17 is provided with a male discharge projection or nipple 20 which is insertable and removable with a liquid-tight fit into and from the top of a female receptacle or sump 21 mounted on a support bracket 22.

The sump 21 has a bottom opening and the bottom is equipped with an outlet fitting 23 from which a connection 19 can be made to a beverage dispensing valve 24 which is solenoid-controlled and which has a bottom discharge spout 25. It will be apparent that when the valve 24 is actuated to its open position, beverage from the interior of the reservoir 17 will flow by gravity from the sump 21 through right-angle fitting 23 and conduit 19 to valve 24 and discharge from the spout 25 (FIG. 1) into a cup or other container such as indicated in broken line at 26 in FIG. 2. Preferably, a wire cup locator 29 is provided to facilitate proper placement of cups under the spout 25.

In order for the machine 5 to have the ability to dispense hot water for customers desiring to make tea, hot chocolate, soup or some other beverages, a hot water discharge line 30 (FIG. 4) is provided which leads from a discharge opening in the upper portion of the hot water reservoir 11 downwardly and thence to the front of the machine 5 where it connects with a second solenoid-operated valve 31 having a discharge spout 32.

The machine 5 is provided on one side with a coin-operated mechanism of known commercial type indicated generally at 33 in FIG. 1. The details of this type of mechanism and the manner in which it functions to control the solenoid valves 24 and 31 are known and do not form a feature of the present invention. Briefly, it permits a consumer upon depositing the required coin or coins, to selectively obtain a cup of coffee or hot water.

Figure 5:
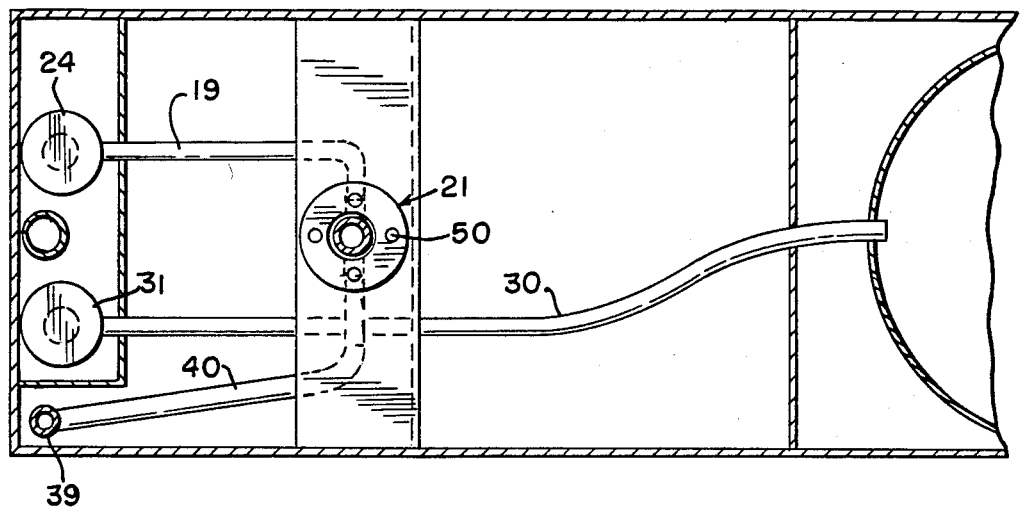
FIG. 5 is a plan view taken on line 5—5 of FIG. 2.
Figure 6:
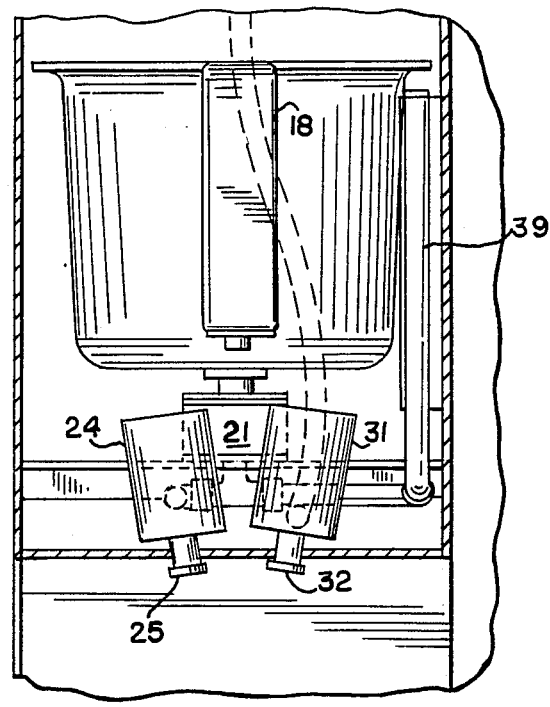
FIG. 6 is a view partly in section and partly in elevation taken on line 6—6 of FIG. 2.

Normally, the door for the opening to the interior of the coin-operated mechanism 33 is locked as is also a downwardly opening door 34 which leads to the compartment in which the reservoir 17 is confined. The door 34 is hinged at the bottom as indicated at 35 (FIG. 1) and is provided with a vertical slot-like opening 36 through which a sight glass or tube 39 may be viewed which measures and shows the height of liquid within the reservoir 17. The sight glass 39 is connected to the right-angle fitting 23 and sump 21 by a conduit 40 (FIGS. 4 and 5). The lock mechanism for the door 34 is such that it also locks the hinged cover 16 in its downward position and by interlocking the door 34 and the cover 16 neither of these can be moved until the lock 37 is manipulated.

The support for the inner or back end of the reservoir 17 within the housing of the machine 5 is an electric heater 41 at the back of the reservoir compartment. The front or handle-end of the reservoir 17 is supported by a bracket 42 provided with resilient pads 43 at the front. On opening the lock 37 and raising the cover 16 and lowering the door 34, the handle 18 may be grasped and used to tilt the reservoir upwardly thereby lifting it off the pads 43 at the front while at the back it continues to rest on the heater 41. When the reservoir 17 has been tilted sufficiently to fully withdraw the nipple 20 from the sump 21 it can be removed from its compartment through the front access side of the machine 5.

Referring to FIG. 4, the sump or female receptacle 21 comprises a cylindrical block 45 having a counterbored opening or passage 46 extending coaxially therethrough. A diaphragm 47 formed of resilient rubber-like material of appreciable thickness (e.g. 1/16 inch or more) is trapped or secured between the top plantar face of the base 45 and a clamping ring 48 by a plurality of hold down screws 50—50 which extend into the base or block 45.

The diaphragm 47 is provided with a central opening which is sized so as to have a fluid-tight interference fit with the nipple 20. The nose 51 of the nipple 20 is tapered so as to facilitate entry of the nipple 20 into the central opening in the diaphragm 47.

Figure 2:
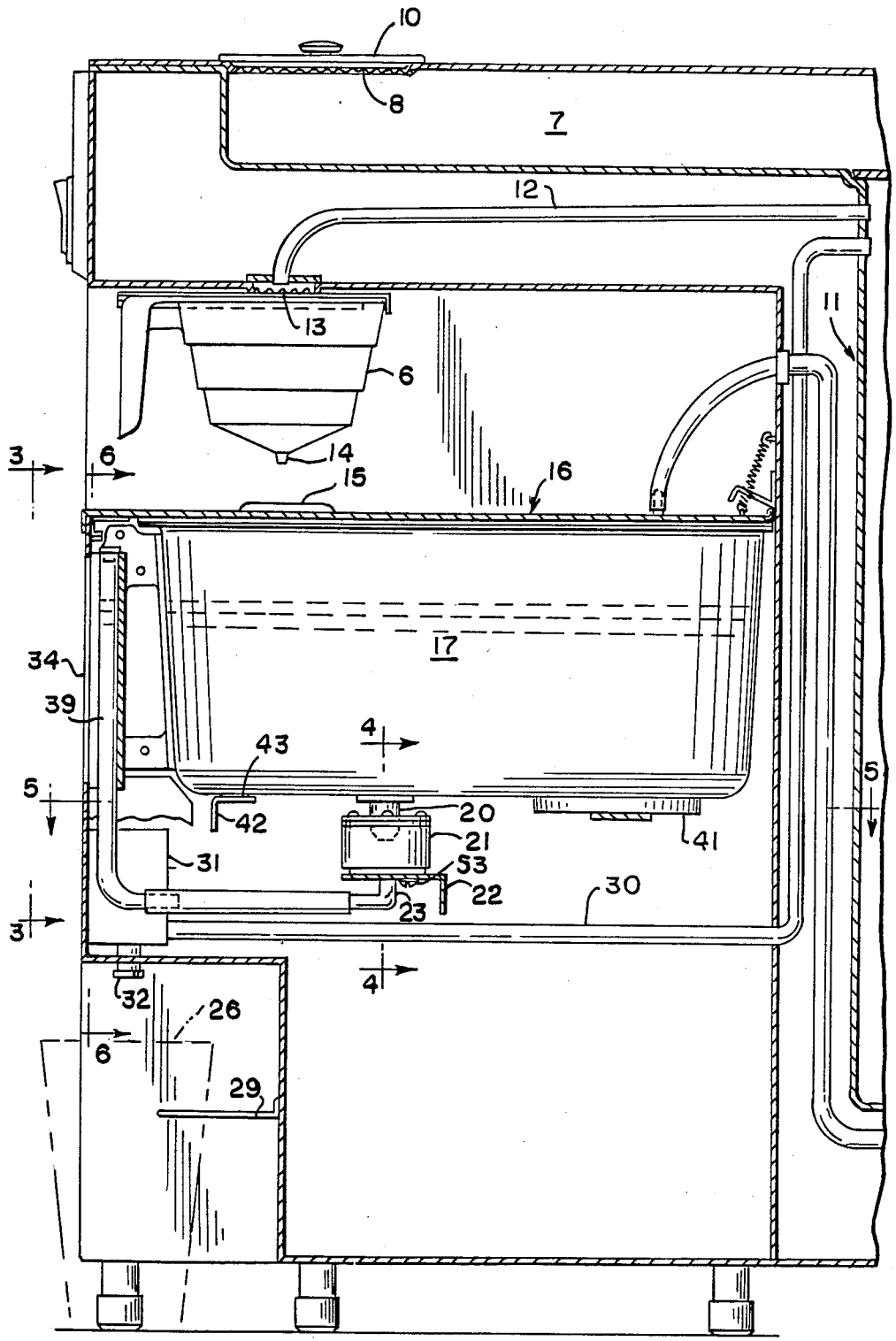
FIG. 2 is a vertical section taken on line 2—2 of FIG. 1.

A ring gasket 52 is inserted between the bottom of the block 45 and the top of the bracket 22 and this assembly is secured in place by means of screws 53 (FIG. 2). The vertical leg 54 on the fitting 23 extends upwardly through the bracket 22 and in fluid-tight relationship through an opening in the gasket 52.

In use, when it is desired to remove the reservoir 17 for cleaning or any other purpose, the lock 37 is unlocked permitting the reservoir cover 16 to be tilted up while the door 34 is turned down. This provides access to the handle 18 of the reservoir 15 which is used to tilt the reservoir 17 upwardly at the front end, thereby withdrawing the nipple 20 from the sump 21. Once the nipple 20 is free of the sump 21, the reservoir 17 can then be removed from its compartment by pulling the same outwardly through the opening previously closed by the door 34.

It will be appreciated that a reversal of operations is performed when the reservoir is replaced. Thus, the reservoir in tilted position is inserted into its compartment until the nipple 20 is over the opening in the sump 21. Thereupon the reservoir is tilted downwardly to its horizontal in-service position. During the lowering movement the nose 51 enters the diaphragm 47 and the fluid-tight relationship shown in FIG. 4 is established. Thereafter, the door 34 is closed, the cover 16 is lowered and the lock 37 is manipulated to its locked position.

What is claimed is:

1. In a coffee-making and dispensing machine having a front access side and wherein coffee discharges by gravity from a brewing funnel into a reservoir from which increments of coffee are discharged by gravity through a conduit leading to a dispensing spout, said reservoir being in a generally level position when said machine is in service and being insertable in and removable from the machine through said front access side when the front end of said reservoir is tilted up;

means providing a connect-disconnect fluid-tight connection between said reservoir and said conduit comprising, a male fitting mounted on the bottom of said reservoir and a female receptacle connected with the inlet end of said conduit;

said female receptacle comprising, a resilient rubber-like diaphragm and means for retaining said diaphragm in a fixed position on said fitting, said diaphragm having an opening sized to receive said male fitting with a fluid-tight interference fit and being sufficiently resilient to permit insertion and removal of said male projection into said opening when said reservoir and thereby said male fitting is tilted with respect to its non-tilted orientation when fully inserted into said opening.

2. In a coffee-making and dispensing machine as called for in claim 1, said means for supporting said resilient rubber-like diaphragm comprising, a base having an opening into which said male fitting may be inserted with the inlet into said opening being surrounded by a planar surface engaged by one side of said diaphragm, a clamping ring engaging the opposite side of said diaphragm, and fastener means for attaching said clamping ring to said base.

3. In a coffee-making and dispensing machine having a front access side and wherein coffee discharges by gravity from a brewing funnel into a reservoir from which increments of coffee are discharged by gravity through a first conduit leading to a dispensing spout and from which said reservoir coffee flows through a second conduit to a sight glass located in said front access side, said reservoir being in a generally horizontal position when said machine is in service and being insertable in and removable from the machine through said front access side when the front end of said reservoir is tilted up;

means providing a connect-disconnect fluid-tight connection between said reservoir and said first conduit comprising, a male fitting mounted on the bottom of said reservoir and a female receptacle connected with the inlet ends of said first and second conduits;

said female receptacle comprising, a resilient rubber-like diaphragm and means for supporting said diaphragm in a fixed position on said receptacle, said diaphragm having an opening sized to receive said male fitting with a fluid-tight interference fit and being sufficiently resilient to permit insertion and removal of said male projection into said opening when said male fitting is tilted with respect to its non-tilted orientation when fully inserted into said opening.

* * * * *